(12) United States Patent
Chen et al.

(10) Patent No.: US 10,921,670 B1
(45) Date of Patent: Feb. 16, 2021

(54) ARRAY SUBSTRATE AND VEHICLE-MOUNTED DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Lin Chen, Beijing (CN); Chengshao Yang, Beijing (CN); Tao Ma, Beijing (CN); Dengfeng Wang, Beijing (CN); Wenhao Tang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/838,421

(22) Filed: Apr. 2, 2020

(30) Foreign Application Priority Data

Sep. 12, 2019 (CN) .......................... 2019 1 0865107

(51) Int. Cl.
| | | |
|---|---|---|
| *G02F 1/136* | (2006.01) | |
| *G02F 1/1362* | (2006.01) | |
| *G02F 1/1343* | (2006.01) | |
| *B60K 35/00* | (2006.01) | |

(52) U.S. Cl.
CPC ........ *G02F 1/136286* (2013.01); *B60K 35/00* (2013.01); *G02F 1/13439* (2013.01); *G02F 1/134309* (2013.01); *B60K 2370/152* (2019.05); *G02F 2201/123* (2013.01)

(58) Field of Classification Search
CPC ................................................ G02F 1/136286
See application file for complete search history.

(56) References Cited

U.S. PATENT DOCUMENTS

| | | | |
|---|---|---|---|
| 2012/0081274 A1* | 4/2012 | Chang | ................. H01L 27/1255 345/92 |
| 2016/0299614 A1* | 10/2016 | Yang | ................. G02F 1/136209 |

\* cited by examiner

*Primary Examiner* — James A Dudek
(74) *Attorney, Agent, or Firm* — Arent Fox LLP; Michael Fainberg

(57) ABSTRACT

An array substrate and a vehicle-mounted display device. A first transistor of the array substrate includes a source electrode connected with a pixel electrode, a drain electrode and a gate electrode, a compensation gate electrode connected with the gate electrode, the sum of an overlapping region of the source electrode and the gate electrode and an overlapping region of the source electrode and the compensation gate electrode is a first overlapping region. A second transistor includes a source electrode connected with a pixel electrode, a drain electrode and a gate electrode, a compensation gate electrode connected with the gate electrode, the sum of an overlapping region of the source electrode and the gate electrode and an overlapping region of the source electrode and the compensation gate electrode is a second overlapping region. An area of the first overlapping region is equal to an area of the second overlapping region.

16 Claims, 7 Drawing Sheets

ARRAY SUBSTRATE AND VEHICLE-MOUNTED DISPLAY DEVICE

CROSS-REFERENCE TO RELATED APPLICATION

This application claims priority of Chinese Patent Application No. 201910865107.5, filed on Sep. 12, 2019, which is hereby incorporated by reference in its entirety.

FIELD

The present disclosure relates to the display field, in particular to an array substrate and a vehicle-mounted display device.

BACKGROUND

With development of display devices, liquid crystal displays have been widely used in daily life, such as mobile phone screens, computer displays and on-board displays.

A Dual Gate drive design can reduce the number of Data IC pins by half and effectively reduce a production cost.

SUMMARY

Some embodiments of the present disclosure provide an array substrate, including: gate line groups formed by a plurality of dual-gate lines extending in a first direction on a base substrate, and respectively arranged between rows of pixels;

a plurality of data lines extending in a second direction, and arranged between every two columns of pixels, and two adjacent columns of pixels being connected with the same data line; and a plurality of pixel electrode groups arranged between adjacent gate line groups, the pixel electrode groups respectively include two pixel electrodes positioned at two sides of one data line, and the two pixel electrodes being electrically connected with the same data line through a first transistor and a second transistor respectively;

wherein the first transistor includes a first source electrode, a first drain electrode and a gate electrode, and a first compensation gate electrode connected with the first gate electrode, wherein the first source electrode is configured to be connected with the pixel electrode, and an overlapping region of the first source electrode and the first gate electrode and an overlapping region of the first source electrode and the first compensation gate electrode form a first overlapping region;

the second transistor includes a second source electrode, a second drain electrode and a second gate electrode, and a second compensation gate electrode connected with the second gate electrode, wherein the second source electrode is configured to be connected with the pixel electrode, and an overlapping region of the second source electrode and the second gate electrode and an overlapping region of the second source electrode and the second compensation gate electrode form a second overlapping region; and an area of the first overlapping region is equal to an area of the second overlapping region.

In one possible implementation manner, the first source electrode, the first gate electrode, the first drain electrode and the first compensation gate electrode are respectively symmetric with the second source electrode, the second gate electrode, the second drain electrode and the second compensation gate electrode about a center of a data line segment between gate lines on both sides of the two pixel electrodes; and the first source electrode and the first compensation gate electrode extend in a same direction, or the second source electrode and the second compensation gate electrode extend in the same direction.

In one possible implementation manner, the first source electrode and the first compensation gate electrode are strip-shaped, or the second source electrode and the second compensation gate electrode are strip-shaped; wherein the first compensation gate electrode is arranged at an end, away from the first drain electrode, of the first source electrode and located at a different layer from the first source electrode; the second compensation gate electrode is arranged at an end, away from the second drain electrode, of the second source electrode and located at a different layer from the second source electrode.

In one possible implementation manner, the first gate electrode and the first compensation gate electrode are connected with each other through a gate line, or the second gate electrode and the second compensation gate electrode are connected with each other through a gate line.

In one possible implementation manner, the first compensation gate electrode, the second compensation gate electrode are coupled to the gate lines through a connection part; and the array substrate further comprises a first signal line located between adjacent pixel electrode groups, and an orthographic projection of the connection part on the base substrate does not overlap with an orthographic projection of the first signal line on the base substrate.

In one possible implementation manner, the first source electrode comprises: a first main body part and a first extension part extending from the first main body part in the first direction toward a region where the first gate electrode is located;

a first sub-overlapping region is between the first extension part and the first gate electrode;

a second sub-overlapping region is between the first main body part and the first compensation gate electrode; and a width of the first compensation gate electrode in the second direction is same as a width of the first extension part in the second direction;

the second source electrode comprises: a second main body part and a second extension part extending from the second main body part in the first direction toward a region where the second gate electrode is located;

a third sub-overlapping region is between the second extension part and the second gate electrode;

a fourth sub-overlapping region is between the second main body part and the second compensation gate electrode; and a width of the second compensation gate electrode in the second direction is same as a width of the second extension part in the second direction.

In one possible implementation manner, the first main body part and the second main body part are block-shape, and a width of the first main body part in the second direction is greater than a width of the first extension part, a width of the second main body part in the second direction is greater than a width of the second extension part.

In one possible implementation manner, the first drain electrode is U-shaped, and the first extension part penetrates into an opening of the U-shaped drain electrode;

a bottom of the U-shaped drain electrode is connected with the data line, and a side of the U-shaped drain electrode extends in the first direction;

a projection of the U-shaped drain electrode is positioned in the first gate electrode; and the first main body part of the first source electrode covers at least part of the first compensation gate electrode.

In one possible implementation manner, the first transistors and the second transistors located in the same column and the same row are periodically and repeatedly arranged.

Some embodiments of the present disclosure also provide a vehicle-mounted display device, including the array substrate provided by the embodiments of the present disclosure.

DETAILED DESCRIPTION OF THE EMBODIMENTS

In order to make the purpose, technical scheme and advantages of the embodiments of the present disclosure clearer, the technical scheme in the embodiments of the present disclosure will be clearly and completely described below with reference to drawings in the embodiments of the present disclosure. Obviously, the described embodiments are only part of the embodiments of the present disclosure, not all of the embodiments. Based on the embodiments described in the present disclosure, all other embodiments obtained by those of ordinary skill in the art without creative labor are within the scope of protection of the present disclosure.

Unless otherwise defined, technical terms or scientific terms used in the present disclosure shall have the ordinary meaning understood by those with ordinary skills in the field to which the present disclosure belongs. The words "first", "second" and the like used in the present disclosure do not indicate any order, quantity or importance, but are only used to distinguish different components. Words like "comprise" or "include" mean that the elements or articles appearing before the words cover the elements or articles listed after the words and their equivalents, and do not exclude other elements or articles. Words like "connect" are not limited to physical or mechanical connection, but may include electrical connection, whether direct or indirect. "Up", "down", "left" and "right" are only used to indicate the relative positional relationship. When the absolute position of a described object changes, the relative positional relationship may also change accordingly.

In order to keep the following description of embodiments of the present disclosure clear and concise, detailed descriptions of known functions and known components are omitted from the present disclosure.

The Dual Gate drive design will cause transistor structures corresponding to adjacent subpixels to be asymmetrical, which will further lead to the problem that when a Dual Gate display product performs a picture test, the subpixels on one side of a data line do not flicker when in adjacent two frames, while the adjacent subpixels on the other side of the data line flicker when in adjacent two frames.

Figure 1:
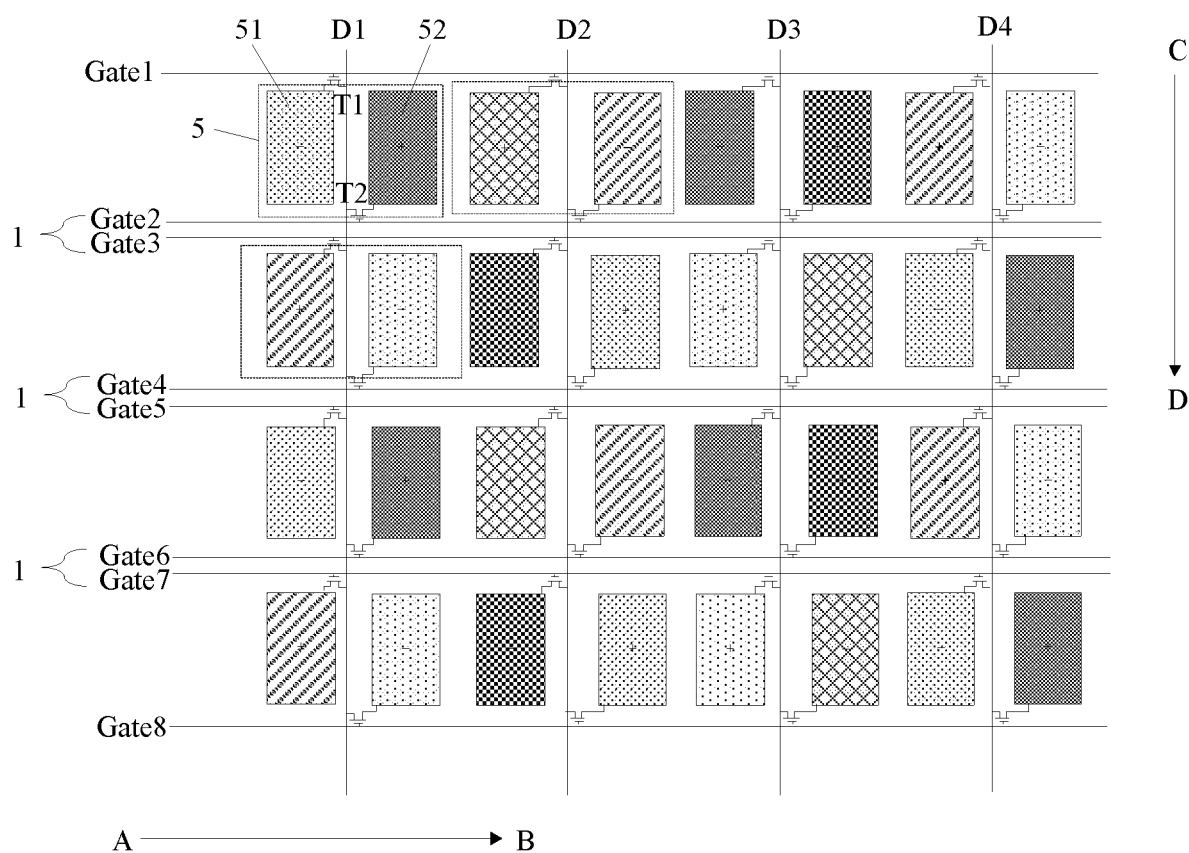
FIG. 1 is a top view structural diagram of an array substrate according to the embodiments of the present disclosure.
Figure 2:
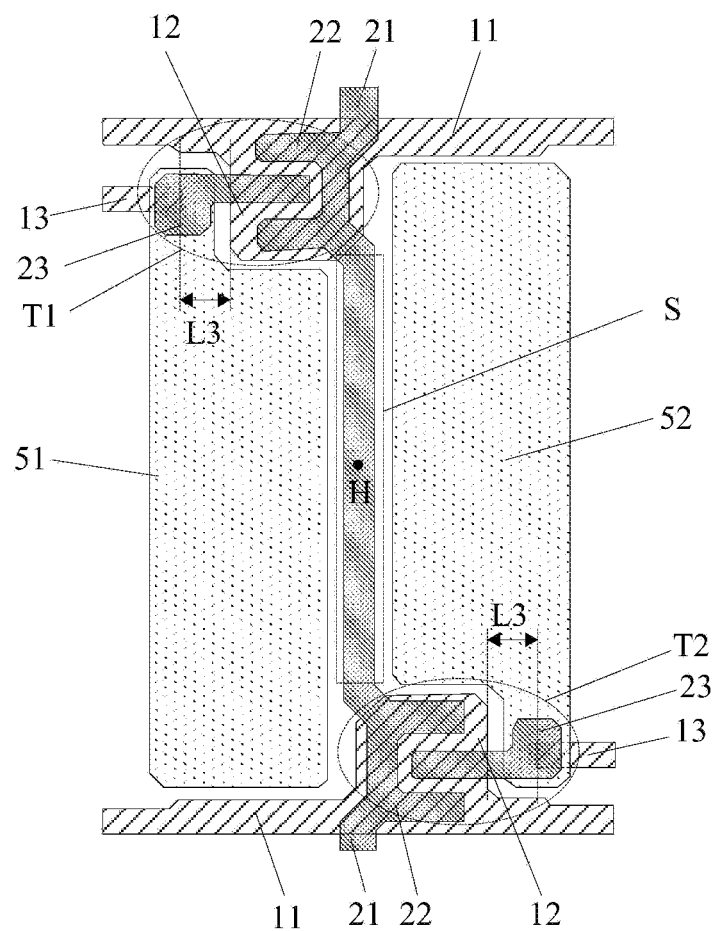
FIG. 2 is a structural diagram of a pixel electrode group according to the embodiments of the present disclosure.

Referring to FIGS. 1 and 2, the embodiments of the present disclosure provide an array substrate, including: gate line groups 1 formed by a plurality of dual-gate lines extending along an arrow A to B indicating a first direction (the first direction may specifically be, for example, a transverse direction as shown in FIG. 1) on a base substrate (each gate line group 1 may specifically include two gate lines 11, for example, the second gate line group 1 from top to bottom may include two gate lines, namely, a second gate line Gate2 and a third gate line Gate3), wherein one group of gate lines 11 is arranged every other row of pixels;

a plurality of data lines 21 (the data lines 21 may specifically be D1, D2, D3 and D4 in FIG. 1) extending along an arrow C to D indicating a second direction (the second direction may specifically be, for example, a vertical direction as shown in FIG. 1), wherein one data line 21 is arranged every other two columns of pixels, and two adjacent columns of pixels are connected with the same data line 21; and a plurality of pixel electrode groups 5 positioned between adjacent gate line groups 1, wherein each pixel electrode group 5 includes two pixel electrodes respectively positioned at two sides of one data line 21, for example, as shown in FIG. 1, each pixel electrode group 5 includes a first pixel electrode 51 located on a left side of the data line 21 and a second pixel electrode 52 located on a right side of the data line 21, the two pixel electrodes are electrically connected with the same data line 21 through a first transistor T1 and a second transistor T2 respectively, for example, in FIG. 1, the first pixel electrode 51 of the first pixel electrode group 5 on the upper left is electrically connected with the first data line 21 on the left through the first transistor T1, and the second pixel electrode 52 of the first pixel electrode group 5 on the upper left is electrically connected with the first data line 21 on the left through the second transistor T2.

Referring to FIG. 2, the first transistor T1 includes a source electrode 23 configured to be connected with the pixel electrode, a drain electrode 22 and a gate electrode 12, and a compensation gate electrode 13 connected with the gate electrode 12, and the sum of an overlapping region of the source electrode 23 and the gate electrode 12 and an overlapping region of the source electrode 23 and the compensation gate electrode 13 is a first overlapping region;

the second transistor T2 includes a source electrode 23 configured to be connected with the pixel electrode, a drain electrode 22 and a gate electrode 12, and a compensation gate electrode 13 connected with the gate electrode 12, and the sum of an overlapping region of the source electrode 23 and the gate electrode 12 and an overlapping region of the source electrode 23 and the compensation gate electrode 13 is a second overlapping region; and the area of the first overlapping region is equal to the area of the second overlapping region.

That is, there is a first capacitance C1 between the source electrode 23 and the gate electrode 12, and a compensation capacitance Cs between the source electrode 23 and the compensation gate electrode 13, register capacitances C of two transistors (such as the first transistor T1 and the second transistor T2 in FIG. 2) electrically connected with the two pixel electrodes in the same pixel electrode group 5 are the same, and the register capacitance C is the sum of the first capacitance C1 and the compensation capacitance Cs. When the transistor connects the pixel electrode to the data line 21, specifically, the gate electrode 12 of the transistor is electrically connected with the gate line 11, the drain electrode 22 is electrically connected with the data line 21, and the source electrode 23 is electrically connected with the pixel electrode (the first pixel electrode 51 or the second pixel electrode 52). When the gate line 11 is loaded with an effective signal, the source electrode 23 of the transistor is connected with the drain electrode 22 to load the effective signal of the data line 21 to the pixel electrode. The two pixel electrodes of the same pixel electrode group 5 are respectively electrically connected with two different gate lines 11 on upper and lower sides of the pixel electrode group 5 through the transistors.

The beneficial effects of the embodiments of the present disclosure are as follows: according to the array substrate provide by the embodiments of the present disclosure, the first or second transistor includes the source electrode 23, the gate electrode 12 and the compensation gate electrode 13, there is a first capacitance C1 between the source electrode 23 and the gate electrode 12, and a compensation capacitance Cs between the source electrode 23 and the compensation gate electrode 13, and the area of the first overlapping region is equal to the area of the second overlapping region; the register capacitances C of the two transistors electrically connected with the same pixel electrode group 5 can be made the same, and the register capacitance C is the sum of the first capacitance C1 and the compensation capacitance Cs; that is, in the array substrate provided by the embodiments of the present disclosure, the compensation gate electrodes 13 are arranged for each transistor, so that the register capacitances C of the two transistors of the same pixel electrode group are the same, which makes ΔVp (a difference between an ideal Pixel voltage and an actual Pixel voltage) of two adjacent subpixels the same; and when the same common voltage is provided, a consistent deflection degree of liquid crystals is realized when the subpixels on one side of the data line 21 are in adjacent frames and flickering does not occur, and the consistent deflection degree of the liquid crystals is realized also when the adjacent subpixels on the other side of the data line 21 are in adjacent frames and flickering does not occur, so that the problem that for a Dual Gate display product in the related art, among subpixels on two sides of one data line 21, pixels on one side flicker can be solved. Compared with the related art, the following problem can be avoided, that is, offset between a gate layer and a source-drain layer can be caused by process fluctuation, resulting in difference in Cgs (capacitance formed by the gate electrode and the source electrode) of transistors corresponding to adjacent subpixels of the Dual Gate product, difference in ΔVp and difference in required optimal common voltage (Vcom), when a picture test is performed, for example, when a Flicker Pattern test of 102APattern is performed, a 1+2dot inversion method (a picture to be tested and displayed is a static picture, and voltages applied to the pixel electrodes of the same pixel in the adjacent two frames are the same in magnitude and opposite in polarity) is adopted, if the voltages of the right subpixels of the same data line are symmetrical in the adjacent two frames, flickering does not occur, while flickering occurs for the left subpixels because ΔVp is larger than the right and the positive and negative voltages deviate from a Vcom center.

It should be noted that for traditional Dual Gate display products, ΔVp and Cgs generally have the following relationship:

$$\Delta Vp = \frac{C_{gs}}{C_{LC} + C_{st} + C_{gs}} \times (V_{gh} - V_{gl});$$

wherein ΔVp is the difference between the ideal Pixel voltage and the actual Pixel voltage, Cgs is the capacitance formed by the gate electrode and the source electrode, $C_{LC}$ is a liquid crystal capacitance, Cst is a storage capacitance, Vgh is an on voltage of the transistor, and Vgl is an off voltage of the transistor.

Figure 3:
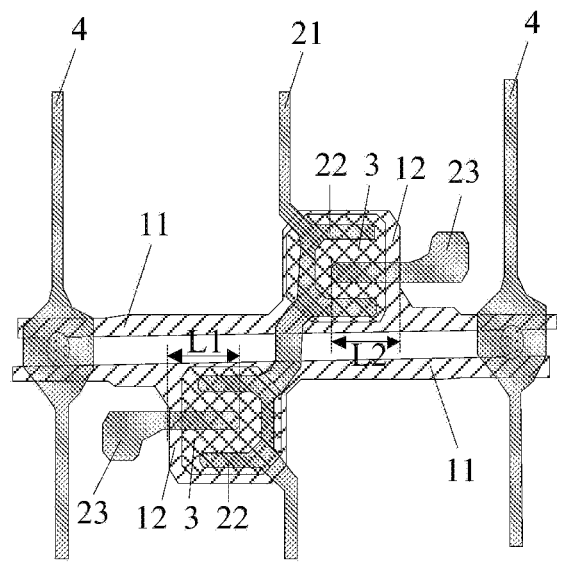
FIG. 3 is a structural diagram when a source-drain layer is not offset from agate layer.
Figure 4:
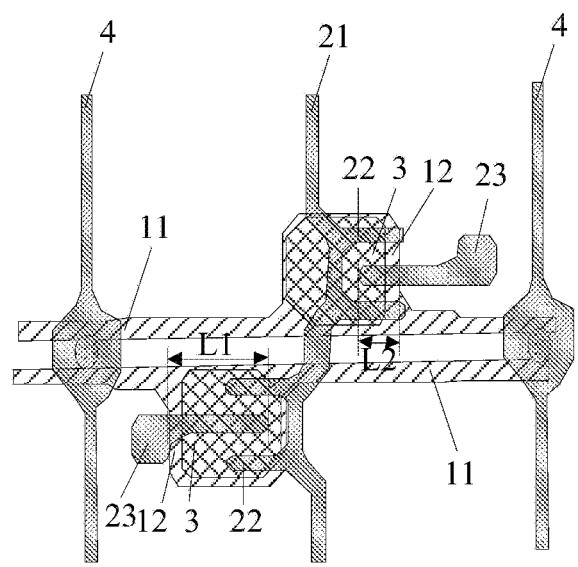
FIG. 4 is a structural diagram after the source-drain layer is offset from the gate layer.

When SD shifts slightly to the right with respect to the Gate layer, referring to FIGS. 3 and 4, wherein FIG. 3 is a structural diagram of the pixel when SD does not shift with respect to the Gate layer, and FIG. 4 is a structural diagram of the pixel when SD shifts to the right with respect to the Gate layer, it can be seen that for the left subpixels, L1 after shifting becomes larger than L1 without shifting, that is, the overlapping area of the tongue-shaped source electrode 23 and the gate electrode 12 increases, and Cgs becomes larger; and for the right subpixels, L2 after shifting becomes smaller than L2 without shifting, that is, the overlapping area of the tongue-shaped source electrode 23 and the gate electrode 12 decreases, Cgs becomes smaller, resulting in inconsistent Cgs of adjacent subpixels on both sides of the same data line, further leading to different ΔVp (ΔVp on the left is larger).

Figure 5:
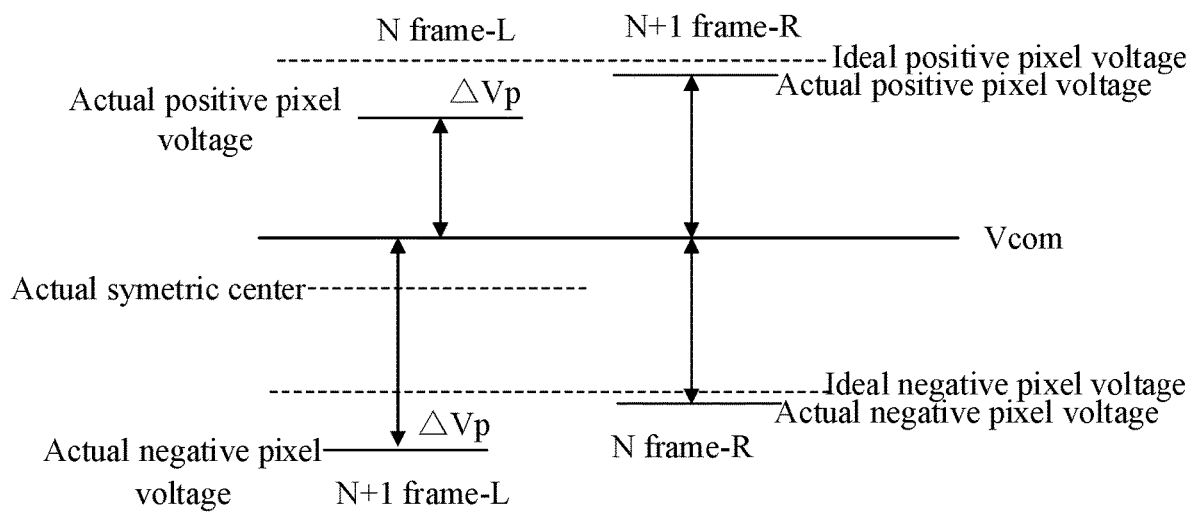
FIG. 5 is a distribution diagram of pixel voltages obtained by subpixels on different sides of a data line under the same common voltage according to the embodiments of the present disclosure.

Referring to FIG. 5, if a common voltage Vcom is applied to a common electrode (the common electrode and the pixel electrode form a voltage difference to deflect the liquid crystals) when the liquid crystals deflect in adjacent picture frames, the common voltage Vcom can make the voltages of the pixel electrodes of the subpixels on the right of the same data line (data) in the Nth frame and the N+1th frame symmetrical with respect to the common voltage Vcom, i.e., in the adjacent two frames, the differences between the pixel voltages of the right subpixels and the common voltage are the same, the liquid crystal deflection degrees are the same, and flickering does not occur; however, due to the large ΔVp of the left subpixels, applying pixel voltages with the same magnitude and opposite polarities when in the Nth frame and the N+1th frame, the actual pixel voltages of the Nth frame and the N+1th frame are asymmetric with respect to the common voltage Vcom (the symmetric centers of the voltages of the Nth frame and the N+1th frame of the left subpixels are dotted lines), so the centers of the voltages of the left subpixels in the Nth frame and the N+1th frame are offset from Vcom brightness of the positive frame is lower, and brightness of the negative frame is higher), and pixel brightness is different, causing flickering. If the voltage indicated at the dotted lines in FIG. 5 is applied, the left subpixels can obtain the optimal Vcom, while the right subpixels will flicker.

In the embodiments of the present disclosure, referring to FIG. 2, by arranging the compensation gate electrodes 13 for each transistor, if SD shifts slightly to the right with respect to the Gate layer, the registration capacitance C of the left subpixels will not change (the first capacitance C1 between the source electrode 23 and the gate electrode 12 becomes larger, the compensation capacitance Cs between the source electrode 23 and the compensation gate electrode 13 decreases, and the overall registration capacitance C remains unchanged), similarly, the registration capacitance C of the right subpixels will not change (the first capacitance C1 between the source electrode 23 and the gate electrode 12 becomes smaller, the compensation capacitance Cs between the source electrode 23 and the compensation gate electrode 13 becomes larger, and the overall registration capacitance C does not change). When Vgh-Vgl, CLC and Cst are the same, ΔVp of two adjacent columns are the same, which solves the flicker problem under the optimal common voltage Vcom.

In specific implementation, the register capacitances C of two transistors on both sides of the same data line can be adjusted according to various factors affecting the capacitance. Optionally, as shown in FIG. 2, in each transistor, a first overlapping region exists between the source electrode 23 and the gate electrode 12, a second overlapping region exists between the source electrode 23 and the compensation gate electrode 13, and the transistors share the same sum of the areas of the first overlapping region and the second overlapping region. In the embodiments of the present disclosure, the capacitance is controlled by controlling the overlapping region between the source electrode 23 and the gate electrode 12 and the overlapping region between the source electrode 23 and the compensation gate electrode 13, so the register capacitances of two transistors electrically connected with the same pixel electrode group 5 can be made the same in a simple manner.

In specific implementation, the compensation gate electrode 13 and the gate electrode 12 are in the same layer and made of the same material, and can be formed by one-time patterning.

In specific implementation, as shown in FIGS. 1 and 2, the source electrodes 23, the gate electrodes 12, the drain electrodes 22, and the compensation gate electrodes 13 of the first transistor and the second transistor connected with the two pixel electrodes are symmetrically disposed about a center H of a data line segment S between the gate lines 11 on both sides of the two pixel electrodes.

Since the first transistor and the second transistor are symmetrically arranged about the center of the data line segment between the gate lines 11 on both sides of the two pixel electrodes (image overlapping after rotating by 180 degrees), structures and shapes of the first transistor and the second transistor are similar. Only the first transistor will be described below, and the second transistor will not be described.

The source electrode 23 and the compensation gate electrode 13 of the first transistor T1 both extend in the same direction. It may be the first direction or the second direction.

In specific implementation, when extending in the second direction, a U-shaped drain opening is disposed toward the gate lines. The source electrode 23 and the compensation gate electrode 13 are strip-shaped overall, and can be arranged on the same side of the gate lines or on different sides.

In specific implementation under another scenario, referring to FIGS. 1 and 2, the source electrode 23 and the compensation gate electrode 13 of the first transistor T1 are strip-shaped and both extend in the first direction, and the compensation gate electrode 13 is disposed at the end, away from the drain electrode 22, of the source electrode 23 and located at a different layer from the source electrode 23.

The general U-shaped drain opening faces the pixel electrodes, the same as the gate line extending direction.

In specific implementation, as shown in FIGS. 1 and 2, in the same transistor, the compensation gate electrode 13 and the gate electrode 12 are both located on the same side of a gate line 11, and are located on the side close to the pixel electrode connected with the transistor. That is, for example, as shown in FIG. 2, for the first transistor T1 on the upper side, the gate electrode 12 is electrically connected to a lower side of the gate line 11, and the compensation gate electrode 13 is also electrically connected to the lower side of the gate line 11. In the embodiments of the present disclosure, in the same transistor, the compensation gate electrode 13 and the gate electrode 12 are both electrically connected to the same side of a gate line 11. When the source-drain layer shifts to the left or right with respect to the gate layer (shifting caused by movement in the first direction), the total register capacitance can be ensured to be unchanged.

In specific implementation, referring to FIG. 2, the source electrode 23 and the compensation gate electrode 13 both extend in the first direction (i.e., in a transverse direction in FIG. 2), and the compensation gate electrode 13 and the gate electrode 12 are respectively located on both sides of the extension direction of the source electrode 23. In the embodiments of the present disclosure, when the source electrode 23 extends in the first direction, the compensation gate electrode 13 also extends in the first direction, and the compensation gate electrode 13 and the gate electrode 12 are respectively located on two sides of the extension direction of the source electrode 23. When the source-drain layer shifts to the right with respect to the gate layer, for example, for the transistor corresponding to the subpixels on the left side of the data line, due to reduction of the second overlapping region between the compensation electrode 13 and the source electrode 23, the compensation capacitance is decreased, the first overlapping region between the gate electrode 12 and the source electrode 23 will become larger, thus the first capacitance will increase, and the total registered capacitance can be kept unchanged. Similarly, for the transistor corresponding to the subpixels on the right side of the data line, when the source-drain layer shifts to the right with respect to the gate layer, for example, the first overlapping region of the gate electrode 12 and the source electrode 23 will be reduced, thus the first capacitance will be reduced, while the second overlapping region of the compensation gate electrode 13 and the source electrode 23 will be increased, so that the total register capacitance will not change.

In specific implementation, as shown in FIG. 2, there is a first interval L3 between the compensation gate electrode 13 and the gate electrode 12. First intervals L1 of all the transistors are the same, for example, the first interval L1 between the compensation gate electrode 13 and the gate electrode 12 of the transistor on the left side of the data line 21 is the same as the first interval L3 between the compensation gate electrode 13 and the gate electrode 12 of the transistor on the right side of the data line 21. In the embodiments of the present disclosure, the first intervals L3 of all the transistors are the same, which can ensure that when the source-drain layer moves to the left or right with respect to the gate layer, the register capacitances of the two transistors on the two sides of the same data line 21 change by the same amount, thereby making the register capacitances on both sides the same before and after the change.

Figure 6:
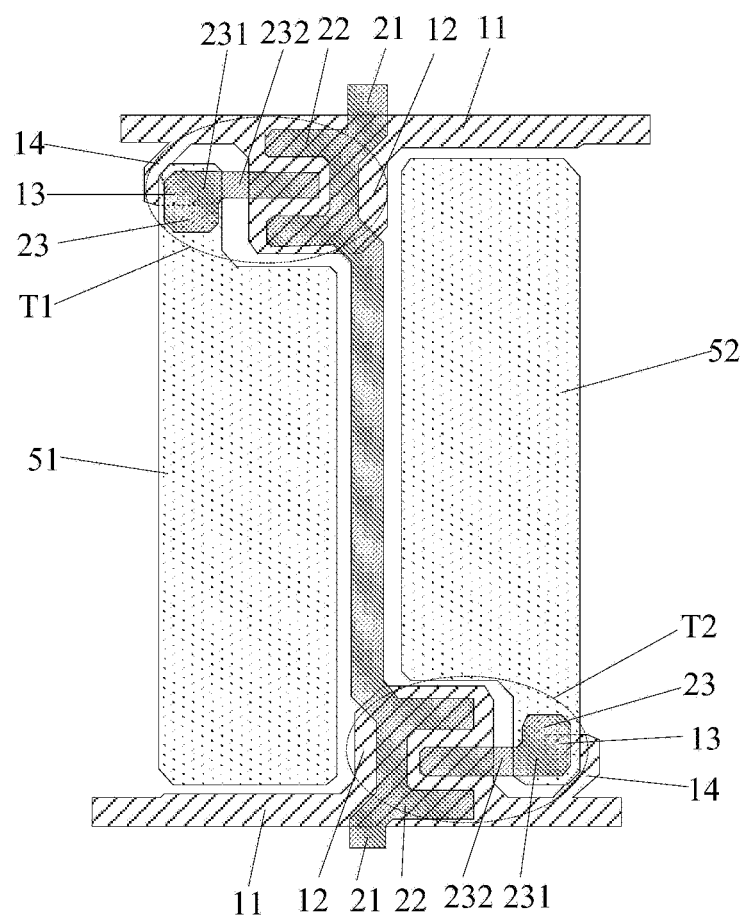
FIG. 6 is a top view structural diagram of an array substrate provided with a connection part according to the embodiments of the present disclosure.

In specific implementation, the gate electrode 12 and the compensation gate electrode 13 of the first transistor T1 are connected through the gate lines 11. Optionally, referring to FIG. 6, the compensation gate electrode 13 and the gate lines 11 are coupled through a connection part 14. In specific implementation, referring to FIG. 7, a display panel further includes a first signal line 4 located between adjacent pixel electrode groups 5, and an orthographic projection of the connection part 14 on the base substrate does not overlap with an orthographic projection of the first signal line 4 on the base substrate. In the embodiments of the present disclosure, the connection part 14 and the first signal line 4 do not overlap, ensuring that other parasitic capacitances are not formed while avoiding the flicker problem, so as not to affect normal display of the display panel in other ways. The first signal line may optionally be a common electrode signal line which supplies signals to the common electrode. Optionally, the transistor may further include an active layer 3. The array substrate may further include a common electrode layer (not shown in the figures), the common electrode layer may be a whole layer, and strip-shaped slits 6 may also be provided in regions corresponding to the pixel electrodes.

Figure 7:
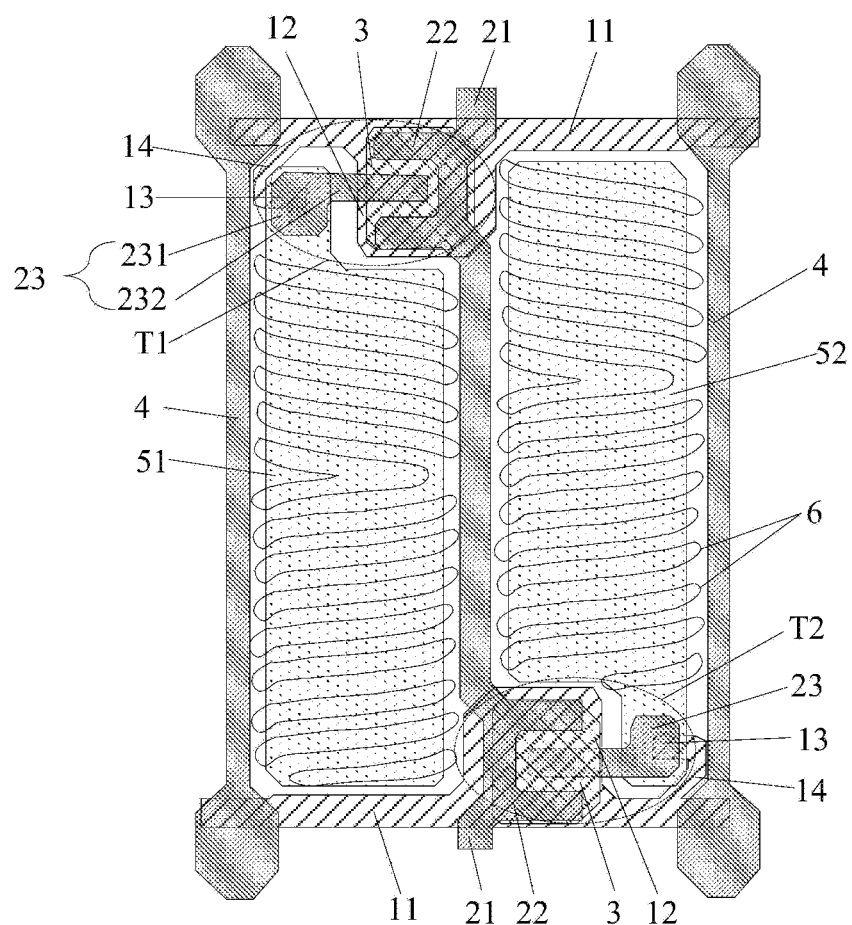
FIG. 7 is atop view structural diagram of an array substrate provided with a first signal line according to the embodiments of the present disclosure.

In specific implementation, referring to FIG. 7, the source electrodes 23 of the first transistor and the second transistor include a main body part 231 and an extension part 232 extending from the main body part in the first direction toward the region where the gate electrode 12 is located;

a first sub-overlapping region exists between the extension part 232 and the gate electrode 12;

a second sub-overlapping region exists between the main body part 231 and the compensation gate electrode 13;

the sum of areas of the first and second sub-overlapping regions corresponding to the first transistor is equal to the area of the first overlapping region;

the sum of areas of the first and second sub-overlapping regions corresponding to the second transistor is equal to the area of the second overlapping region;

a width of the compensation gate electrode 13 in the second direction (a vertical direction in FIG. 7) is the same as a width of the extension part 232 in the second direction (the vertical direction in FIG. 7).

In the embodiments of the present disclosure, the width of the compensation gate electrode 13 and the width of the extension part 232 are the same, which ensures that a reduced capacitance and an increased capacitance of the same transistor are the same during the left-right shifting process, that is, for example, when the source-drain layer moves to the right with respect to the gate layer, for the left subpixels, since the width of the compensation gate electrode 13 is the same as the width of the extension part 232, a reduced value of the compensation capacitance Cs formed by the compensation gate electrode 13 and the source electrode 23 is the same as an increased value of the first capacitance C1 formed by the gate electrode 12 and the source electrode 23, thereby making the total register capacitance the same. Similarly, the register capacitance of the right subpixels can also be made the same.

In specific implementation, the main body part 231 is a block, and a width of the main body part in the second direction is greater than the width of the extension part 232. In the embodiments of the present disclosure, the width of the main body part 231 in the second direction is larger than the width of the extension part 232, which can ensure that a reduced capacitance is the same as an increased capacitance in the same transistor and the total capacitance remains unchanged during the up-down shifting process of the source-drain layer relative to the gate layer.

In specific implementation, referring to FIG. 7, the drain electrode 22 of the first transistor T1 is U-shaped, and the extension part 232 penetrates into the opening of the u-shaped drain electrode 22.

A bottom of the U-shaped drain electrode 22 is connected with the data line 21, and a side of the U-shaped drain electrode 22 extends in the first direction.

A projection of the U-shaped drain electrode 22 is located in the gate electrode 12.

The main body part 231 of the source electrode 23 covers at least part of the compensation gate electrode 13.

In specific implementation, the compensation gate electrodes 13 of all the transistors have the same length in the first direction.

In specific implementation, the first transistors T1 and the second transistors T2 located in the same column and the same row are periodically and repeatedly arranged.

Figure 8:
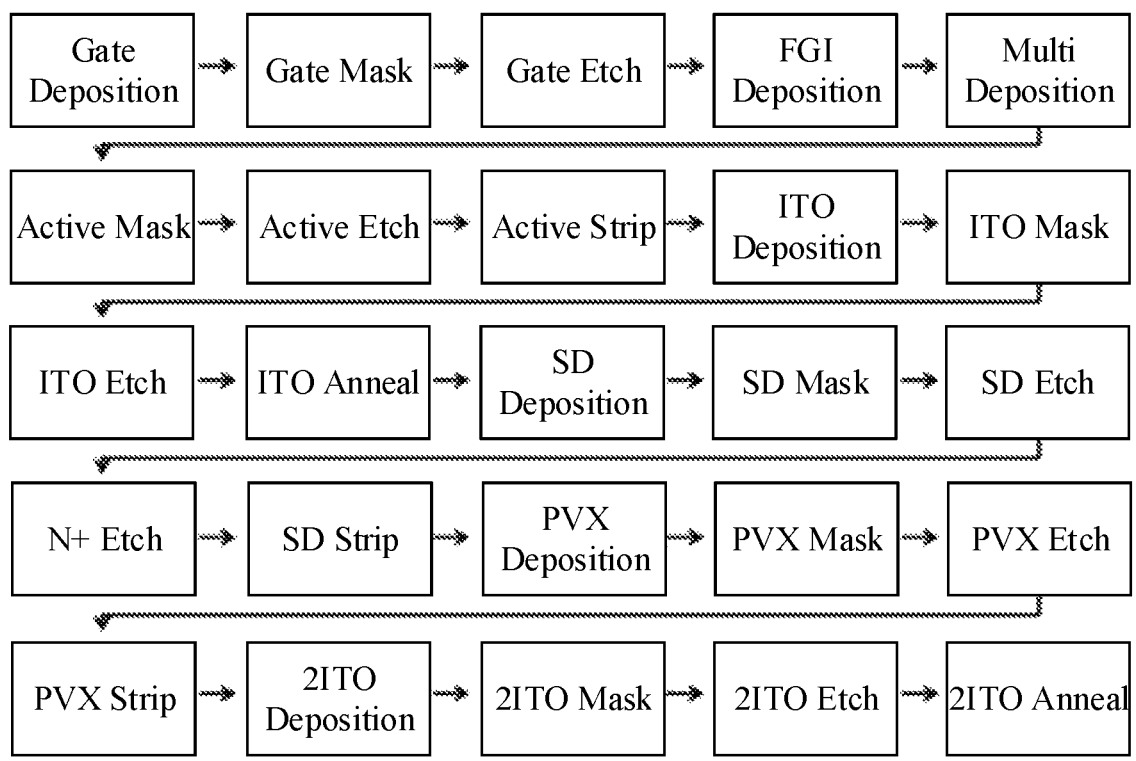
FIG. 8 is a manufacturing flow diagram of an array substrate according to the embodiments of the present disclosure.

In specific implementation, the fabrication process of the array substrate is specifically shown in FIG. 8, wherein indium tin oxide (ITO) fabricated after the active layer and before the source-drain layer (SD) can be used as a pixel electrode layer, and 2ITO fabricated after a passivation layer (PVX) can be used as a common electrode layer.

Based on the same inventive concept, the embodiments of the present disclosure also provide a liquid crystal display panel, which includes the array substrate provided by the embodiments of the present disclosure.

Based on the same inventive concept, the embodiments of the present disclosure also provide a vehicle-mounted display device, which includes the array substrate provided by the embodiments of the present disclosure. Vehicle-mounted display products need to operate under more severe conditions (high temperature, high humidity) and have higher requirements than other consumer products. The display device provided by the embodiments of the present disclosure may be suitable for vehicle-mounted display under more severe use environments.

The beneficial effects of the embodiments of the present disclosure are as follows: according to the array substrate provide by the embodiments of the present disclosure, the first or second transistor includes the source electrode 23, the gate electrode 12 and the compensation gate electrode 13, there is the first capacitance C1 between the source electrode 23 and the gate electrode 12, and the compensation capacitance Cs between the source electrode 23 and the compensation gate electrode 13, and the area of the first overlapping region is equal to the area of the second overlapping region; register capacitances C of two transistors electrically connected with the same pixel electrode group 5 can be made the same, and the register capacitance C is the sum of the first capacitance C1 and the compensation capacitance Cs; that is, in the array substrate provided by the embodiments of the present disclosure, the compensation gate electrodes 13 are arranged for each transistor, so that the register capacitances C of the two transistors of the same pixel electrode group 5 are the same, which makes ΔVp (the difference between an ideal Pixel voltage and an actual Pixel voltage) of two adjacent subpixels the same; and when the same common voltage is provided, a consistent deflection degree of liquid crystals is realized when the subpixels on one side of the data line 21 are in adjacent frames and flickering does not occur, and the consistent deflection degree of the liquid crystals is realized also when the adjacent subpixels on the other side of the data line 21 are in adjacent frames and flickering does not occur, so that the problem that for a Dual Gate display product in the related art, among subpixels on two sides of the same data line 21, pixels on one side flicker can be solved. Compared with the related art, the following problem can be avoided, that is, offset between a gate layer and a source-drain layer can be caused by process fluctuation, resulting in difference in Cgs (capacitance formed by the gate electrode and the source electrode) of transistors corresponding to adjacent subpixels of the Dual Gate product, difference in ΔVp and difference in required optimal common voltage (Vcom), when a picture test is performed, for example, when a Flicker Pattern test of 102APattern is performed, a 1+2dot inversion method (a picture to be tested and displayed is a static picture, and voltages applied to the pixel electrodes of the same pixel in the adjacent two frames are the same in magnitude and opposite in polarity) is adopted, if the voltages of the right subpixels of the same data line are symmetrical in the adjacent two frames, flickering does not occur, while flickering occurs for the left subpixels because ΔVp is larger than the right and the positive and negative voltages deviate from the Vcom center.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

The invention claimed is:

1. An array substrate, comprising: gate line groups formed by a plurality of dual-gate lines extending in a first direction on a base substrate, and respectively arranged between rows of pixels;
   a plurality of data lines extending in a second direction, and arranged between every two columns of pixels, and two adjacent columns of pixels being connected with a same data line; and
   a plurality of pixel electrode groups arranged between adjacent gate line groups, the pixel electrode groups respectively comprise two pixel electrodes positioned at two sides of one data line, and the two pixel electrodes being electrically connected with a same data line through a first transistor and a second transistor respectively;
   wherein the first transistor comprises a first source electrode, a first drain electrode and a first gate electrode, and a first compensation gate electrode connected with the first gate electrode, wherein the first source electrode is configured to be connected with the pixel electrode, and an overlapping region of the first source electrode and the first gate electrode and an overlapping region of the first source electrode and the first compensation gate electrode form a first overlapping region;
   the second transistor comprises a second source electrode, a second drain electrode and a second gate electrode which are configured to be connected with the pixel electrode, and a second compensation gate electrode connected with the second gate electrode, wherein the second source electrode is configured to be connected with the pixel electrode, and an overlapping region of the second source electrode and the second gate electrode and an overlapping region of the second source electrode and the second compensation gate electrode form a second overlapping region; and
   an area of the first overlapping region is equal to an area of the second overlapping region;
   wherein the first compensation gate electrode, the second compensation gate electrode are coupled to the gate lines through a connection part; and
   the array substrate further comprises a first signal line located between adjacent pixel electrode groups, and an orthographic projection of the connection part on the base substrate does not overlap with an orthographic projection of the first signal line on the base substrate.

2. The array substrate according to claim 1, wherein the first source electrode, the first gate electrode, the first drain electrode and the first compensation gate electrode are respectively symmetric with the second source electrode, the second gate electrode, the second drain electrode and the second compensation gate electrode about a center of a data line segment between gate lines on both sides of the two pixel electrodes; and
   the first source electrode and the first compensation gate electrode extend in a same direction, or the second source electrode and the second compensation gate electrode extend in the same direction.

3. The array substrate according to claim 2, wherein the first source electrode and the first compensation gate electrode are strip-shaped, or the second source electrode and the second compensation gate electrode are strip-shaped; wherein the first compensation gate electrode is arranged at an end, away from the first drain electrode, of the first source electrode and located at a different layer from the first source electrode; the second compensation gate electrode is arranged at an end, away from the second drain electrode, of the second source electrode and located at a different layer from the second source electrode.

4. The array substrate according to claim 1, wherein the first gate electrode and the first compensation gate electrode are connected with each other through a gate line, or the second gate electrode and the second compensation gate electrode are connected with each other through a gate line.

5. The array substrate according to claim 1, wherein the first source electrode comprises: a first main body part and a first extension part extending from the first main body part in the first direction toward a region where the first gate electrode is located;
   a first sub-overlapping region is between the first extension part and the first gate electrode;
   a second sub-overlapping region is between the first main body part and the first compensation gate electrode; and
   a width of the first compensation gate electrode in the second direction is same as a width of the first extension part in the second direction;
   the second source electrode comprises: a second main body part and a second extension part extending from the second main body part in the first direction toward a region where the second gate electrode is located;
   a third sub-overlapping region is between the second extension part and the second gate electrode;
   a fourth sub-overlapping region is between the second main body part and the second compensation gate electrode; and
   a width of the second compensation gate electrode in the second direction is same as a width of the second extension part in the second direction.

6. The array substrate according to claim 5, wherein the first main body part and the second main body part are block-shape, and a width of the first main body part in the second direction is greater than a width of the first extension part, a width of the second main body part in the second direction is greater than a width of the second extension part.

7. The array substrate according to claim 5, wherein the first drain electrode is U-shaped, and the first extension part penetrates into an opening of the U-shaped drain electrode;
- a bottom of the U-shaped drain electrode is connected with the data line, and a side of the U-shaped drain electrode extends in the first direction;
- a projection of the U-shaped drain electrode is positioned in the first gate electrode; and
- the first main body part of the first source electrode covers at least part of the first compensation gate electrode.

8. The array substrate according to claim 1, wherein the first transistors and the second transistors located in a same column and same row are periodically and repeatedly arranged.

9. A vehicle-mounted display device, comprising the array substrate according to claim 1.

10. The vehicle-mounted display device according to claim 9, wherein the first source electrode, the first gate electrode, the first drain electrode and the first compensation gate electrode are respectively symmetric with the second source electrode, the second gate electrode, the second drain electrode and the second compensation gate electrode about a center of a data line segment between gate lines on both sides of the two pixel electrodes; and
- the first source electrode and the first compensation gate electrode extend in a same direction, or the second source electrode and the second compensation gate electrode extend in the same direction.

11. The vehicle-mounted display device according to claim 10, wherein the first source electrode and the first compensation gate electrode are strip-shaped, or the second source electrode and the second compensation gate electrode are strip-shaped; wherein the first compensation gate electrode is arranged at an end, away from the first drain electrode, of the first source electrode and located at a different layer from the first source electrode; the second compensation gate electrode is arranged at an end, away from the second drain electrode, of the second source electrode and located at a different layer from the second source electrode.

12. The vehicle-mounted display device according to claim 9, wherein the first gate electrode and the first compensation gate electrode are connected with each other through a gate line, or the second gate electrode and the second compensation gate electrode are connected with each other through a gate line.

13. The vehicle-mounted display device according to claim 9, wherein the first source electrode comprises: a first main body part and a first extension part extending from the first main body part in the first direction toward a region where the first gate electrode is located;
- a first sub-overlapping region is between the first extension part and the first gate electrode;
- a second sub-overlapping region is between the first main body part and the first compensation gate electrode; and
- a width of the first compensation gate electrode in the second direction is same as a width of the first extension part in the second direction;
- the second source electrode comprises: a second main body part and a second extension part extending from the second main body part in the first direction toward a region where the second gate electrode is located;
- a third sub-overlapping region is between the second extension part and the second gate electrode;
- a fourth sub-overlapping region is between the second main body part and the second compensation gate electrode; and
- a width of the second compensation gate electrode in the second direction is same as a width of the second extension part in the second direction.

14. The vehicle-mounted display device according to claim 13, wherein the first main body part and the second main body part are block-shape, and a width of the first main body part in the second direction is greater than a width of the first extension part, a width of the second main body part in the second direction is greater than a width of the second extension part.

15. The vehicle-mounted display device according to claim 13, wherein the first drain electrode is U-shaped, and the first extension part penetrates into an opening of the U-shaped drain electrode;
- a bottom of the U-shaped drain electrode is connected with the data line, and a side of the U-shaped drain electrode extends in the first direction;
- a projection of the U-shaped drain electrode is positioned in the first gate electrode; and
- the first main body part of the first source electrode covers at least part of the first compensation gate electrode.

16. The vehicle-mounted display device according to claim 9, wherein the first transistors and the second transistors located in a same column and same row are periodically and repeatedly arranged.

* * * * *